Patented June 21, 1949

2,474,185

UNITED STATES PATENT OFFICE 2,474,185

METHOD OF PREPARING 4-AMINO-1, 8-NAPHTHALIC ACID IMIDES

Hans Z. Lecher, Plainfield, Mario Scalera, Somerville, Asa Willard Joyce, Plainfield, and Warren S. Forster, Maplewood, N. J., assignors to American Cyanamid Company, New York, N. Y., a corporation of Maine No Drawing. Application September 5, 1942, Serial No. 457,516

12 Claims. (Cl. 260—281)

This invention relates to an improved method of producing 4-amino-1,8-naphthalic acid imides and includes certain of these compounds as new products which dye cellulose acetate fibers and various resins yellow colors that fluoresce strongly in the yellow and yellow-green under the influence of ultraviolet light.

Common procedures of imide formation by reaction with primary amines have been attempted with 4-amino-1,8-naphthalic acid anhydride, but have been unsatisfactory because of the serious side reactions, probably self-condensation of 4-amino-1,8-naphthalic acid, which result in poor yields and products of low grade.

According to the present invention we have found that, surprisingly, if the amount of primary amine is very greatly increased providing for a considerable excess of amine, and inert diluents are substantially absent, good yields of high grade products are obtained with negligible contamination by side reactions.

The temperature is not critical but temperatures of 150° C. or lower are preferable for smooth reaction. Primary amines having melting points below about 150° C. permit operation under these preferred conditions. Typical amines of the aliphatic, alicyclic, aralkyl, aromatic or heterocyclic series which can be used in the process of the present invention are butylamines, amylamines, dodecylamines, cyclohexylamine, benzylamines and the like, the toluidines, the naphthylamines, furfurylamine, etc. It is an advantage of the present invention that it is not critical with respect to the amine and the same good yields and high purity of product are obtained with a wide variety of primary amines having the necessary melting points.

It is an advantage of the present invention that the excess of amine is in no sense critical, but for best results, it is desirable to use at least five equivalents of amine in the reaction. Where the amine is liquid at room temperature, the 4-aminonaphthalic anhydride may be dissolved therein or in the case of amines which are solids at room temperature, the components may be fused together or the amine may be first melted and the anhydride then introduced therein. One of the striking features of the present process lies in the fact that in the presence of a considerable excess, the 4-aminonaphthalic anhydride dissolves quite readily in the amine whereas this compound is very sparingly soluble in all the ordinary organic solvents.

While the process of the present invention is not restricted to any particular substituent on the imide nitrogen, N-alkylimides are particularly valuable, especially the N-butyl and N-amylamides which constitute the preferred products of the present invention. These dyestuffs dye cellulose acetate fabrics very brilliant yellows which show high fluorescence under ultraviolet light. They are also useful in the dyeing of fabrics or fibers of superpolyamides of the "nylon" type. Fabrics dyed with these dyes are visible in the dark under ultraviolet radiation and are of use in blackouts, theater carpets, stage decorations and the like.

The same products are also very useful for the dyeing of plastics such as cellulose acetate, methacrylate, polystyrene, aminoplasts of the urea or triazine aldehyde type and many other synthetic resins. Particularly in resins which are transparent or translucent, very brilliant effects are obtainable by reason of the bright yellowish-green fluorescence which is exhibited by the preferred products of the present invention.

The invention will be illustrated in greater detail in conjunction with the following typical examples which are illustrative only. The parts are by weight.

Example 1

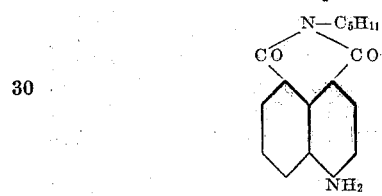

3 parts of 4-amino-1,8-naphthalic anhydride and 12 parts of dry commercial monoamylamine (which is a mixture of isomers) are mixed and the mixture heated to reflux. The clear solution is heated for several hours until the reaction is finished. Then 16 parts of o-dichlorobenzene are added and the excess amine is distilled out. The recovered amine may be reused in the process, but it is advantageous to dry it with solid caustic alkali. The remaining dichlorobenzene solution upon cooling precipitates yellowish crystals which are freed from solvent by steam and dried. The product obtained in very good yield is a mixture of the isomeric amylides of 4-amino-1,8-naphthalic acid and consists of bright green-yellow crystals having a melting point of approximately 167–173° C.

The product, when dispersed by the usual methods, dyes cellulose acetate a brilliant green-yellow with intense fluorescence in ultraviolet light.

This product is also of great interest in dyeing plastics prepared from various synthetic resins, a bright greenish-yellow fluorescence under ultraviolet irradiation being obtainable. Cellulose acetate plastics are particularly important as the lightfastness of the dyestuff appears greater in cellulose acetate plastics than in others.

*Example 2*

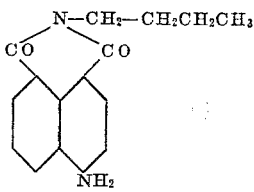

5 parts of 4-amino-1,8-naphthalic anhydride and 20 parts of dry n-butylamine are heated at reflux in a suitable vessel for several hours. 27 parts of chlorobenzene are added and the excess amine is distilled out to be reused after drying. The chlorobenzene solution, on cooling, precipitates orange colored crystals which are filtered off and freed from solvent by steam. The yield of the n-butylimide of 4-amino-1,8-naphthalic acid is about 90% of theory. It forms bright orange crystals melting at 184–185° C. When properly dispersed it dyes cellulose acetate a brilliant greenish-yellow which fluoresces strongly in ultraviolet light. The product may be used also in plastics.

*Example 3*

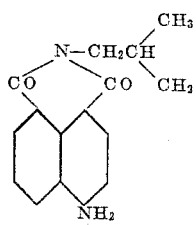

3 parts of 4-amino naphthalic anhydride and 12 parts of isobutylamine are heated at reflux for several hours, 16 parts of o-dichlorobenzene are then added and the excess amine is distilled out. The o-dichlorobenzene solution is cooled and the product, the isobutylimide of 4-amino-1,8-naphthalic acid is precipitated and filtered off. The yellow-orange crystals are freed from solvent by steam and dried. The yield is about 90% of the theoretical and the melting point is 206.5–207.5° C.

The dyestuff after proper dispersion dyes cellulose acetate a brilliant greenish-yellow which fluoresces strongly in ultraviolet light. It may be used also in plastics.

We claim:

1. A process for producing 4-amino-1,8-naphthalic acid imides which comprises reacting 4-amino-1,8-naphthalic anhydride with a large excess of an essentially undiluted primary amine having a melting point not in excess of 150° C.

2. A process for producing 4-amino-1,8-naphthalic acid imides which comprises reacting 4-amino-1,8-naphthalic anhydride in the presence of at least 5 molecular equivalents of an essentially undiluted primary amine having a melting point not in excess of 150° C.

3. A process of making 4-amino-1,8-naphthalic acid imides which comprises reacting 4-amino-1,8-naphthalic acid anhydride with a large excess of essentially undiluted primary alkylamine having a melting point not in excess of 150° C.

4. A process of making 4-amino-1,8-naphthalic acid imides which comprises reacting 4-amino-1,8-naphthalic acid anhydride in the presence of at least 5 molecular equivalents of an essentially undiluted primary alkylamine having a melting point not in excess of 150° C.

5. A process for producing 4-amino-1,8-naphthalic acid imides which comprises reacting 4-amino-1,8-naphthalic anhydride with a large excess of an essentially undiluted primary amine which is a liquid at room temperature.

6. A process for producing 4-amino-1,8-naphthalic acid imides which comprises reacting 4-amino-1,8-naphthalic anhydride in the presence of at least 5 molecular equivalents of an essentially undiluted primary amine which is a liquid at room temperature.

7. A process for making 4-amino-1,8-naphthalic acid imides which comprises dissolving 4-amino-1,8-naphthalic acid anhydride in a large excess of liquid essentially undiluted primary amine, heating the solution until the conversion to the imide is complete, adding an inert diluent having a boiling point considerably higher than that of amine and having but little solvent action on the imide, removing the excess of amine by distillation and recovering the imide by filtration.

8. A process of making 4-amino-1,8-naphthalic acid imides which comprises dissolving 4-amino-1,8-naphthalic acid anhydride in a large excess of liquid essentially undiluted primary alkylamine, heating the solution until the conversion to the imide is complete, adding an inert diluent having a boiling point considerably higher than that of amine and having but little solvent action on the imide, removing the excess of amine by distillation and recovering the imide by filtration.

9. A process according to claim 5 in which the primary amine is a butylamine.

10. A process according to claim 6 in which the primary amine is a butylamine.

11. A method according to claim 5 in which the primary amine is an amylamine.

12. A method according to claim 6 in which the primary amine is an amylamine.

HANS Z. LECHER.
MARIO SCALERA.
ASA WILLARD JOYCE.
WARREN S. FORSTER.

REFERENCES CITED

The following references are of record in the file of this patent:

UNITED STATES PATENTS

| Number | Name | Date |
|---|---|---|
| 1,796,011 | Eckert | Mar. 10, 1931 |
| 1,796,012 | Eckert | Mar. 10, 1931 |
| 1,836,529 | Eckert | Dec. 15, 1931 |
| 1,886,797 | Eckert | Nov. 8, 1932 |
| 1,918,461 | Eckert | July 18, 1933 |
| 1,984,110 | Bodmer | Dec. 11, 1934 |
| 2,006,017 | Eckert | June 25, 1935 |
| 2,096,295 | Eckert | Oct. 19, 1937 |

OTHER REFERENCES

Beilstein, vol. 21, 4th ed., page 527.